(12) United States Patent
Brown (10) Patent No.: US 8,704,477 B2
(45) Date of Patent: Apr. 22, 2014

(54) METHOD OF CONTROLLING A FAN

(71) Applicant: W.E.T. Automotive (China) Ltd., Langfang (CN)

(72) Inventor: Fred A. Brown, Coronado, CA (US)

(73) Assignee: W.E.T. Automotive (China) Ltd., Langfang (CN)

( * ) Notice: Subject to any disclaimer, the term of this patent is extended or adjusted under 35 U.S.C. 154(b) by 0 days.

(21) Appl. No.: 13/668,483

(22) Filed: Nov. 5, 2012

(65) Prior Publication Data

US 2013/0193893 A1 Aug. 1, 2013

Related U.S. Application Data

(60) Provisional application No. 61/587,291, filed on Jan. 17, 2012.

(51) Int. Cl.
*G05B 11/16* (2006.01)
*H02P 3/00* (2006.01)

(52) U.S. Cl.
USPC ........... 318/473; 318/471; 318/254; 318/479; 297/180.13; 297/180.14

(58) Field of Classification Search
USPC ........... 318/400.01, 434, 473, 471, 479, 254; 297/180.12, 180.13, 180.14; 701/36; 327/109; 713/320
See application file for complete search history.

(56) References Cited

U.S. PATENT DOCUMENTS

| | | | |
|---|---|---|---|
| 5,513,361 A * | 4/1996 | Young | 713/320 |
| 6,404,326 B1 | 6/2002 | Timmerman et al. | |
| 6,619,736 B2 * | 9/2003 | Stowe et al. | 297/180.14 |
| 6,676,207 B2 * | 1/2004 | Rauh et al. | 297/180.14 |
| 6,779,981 B2 * | 8/2004 | Huang et al. | 417/42 |
| 6,892,807 B2 * | 5/2005 | Fristedt et al. | 165/202 |
| 7,154,240 B2 * | 12/2006 | Watanabe | 318/434 |
| 7,567,045 B2 * | 7/2009 | Fristedt | 318/400.01 |
| 7,621,594 B2 * | 11/2009 | Hartmann et al. | 297/180.12 |
| 7,873,451 B2 * | 1/2011 | Hartmann et al. | 701/36 |
| 8,002,344 B2 * | 8/2011 | Abe et al. | 297/180.13 |
| 2001/0028185 A1 * | 10/2001 | Stowe et al. | 297/180.13 |
| 2002/0105213 A1 * | 8/2002 | Rauh et al. | 297/180.14 |
| 2003/0091441 A1 * | 5/2003 | Huang et al. | 417/42 |
| 2004/0118555 A1 * | 6/2004 | Fristedt et al. | 165/202 |
| 2005/0194998 A1 * | 9/2005 | Watanabe | 327/109 |
| 2005/0200166 A1 * | 9/2005 | Noh | 297/180.14 |

(Continued)

FOREIGN PATENT DOCUMENTS

| | | |
|---|---|---|
| DE | 40 25 053 A1 | 4/1991 |
| DE | 10 2005 008 457 A1 | 8/2006 |
| EP | 1 741 017 B1 | 1/2011 |
| GB | 2236408 A | 3/1991 |

OTHER PUBLICATIONS

Examination Report for the German Patent DE Application No. 10 2012 005 950.7 dated Oct. 10, 2012.

*Primary Examiner* — Paul Ip
(74) *Attorney, Agent, or Firm* — The Dobrusin Law Firm, P.C.

(57) ABSTRACT

A method of controlling a fan in a vehicle comprising: measuring a control input signal; measuring a continuous applied voltage to the fan; comparing the continuous applied voltage to a look up table; and activating the fan when the control input signal is open and the continuous applied voltage is greater than a system voltage by about 0.5 volts.

20 Claims, 4 Drawing Sheets

(56) References Cited

U.S. PATENT DOCUMENTS

| | | | |
|---|---|---|---|
| 2007/0048121 A1* | 3/2007 | Fristedt | 415/13 |
| 2007/0234742 A1* | 10/2007 | Aoki et al. | 62/3.3 |
| 2007/0253478 A1* | 11/2007 | Fristedt | 375/239 |
| 2008/0136221 A1* | 6/2008 | Hartmann et al. | 297/180.14 |
| 2008/0191520 A1* | 8/2008 | Hartmann et al. | 297/180.12 |
| 2008/0300749 A1* | 12/2008 | Hartmann et al. | 701/36 |
| 2009/0121524 A1* | 5/2009 | Abe et al. | 297/180.1 |

* cited by examiner

METHOD OF CONTROLLING A FAN

FIELD

The present teachings generally relate to a method of controlling a fan and/or blower, and more particularly to a method of controlling a fan and/or blower when the primary controller becomes broken, disconnected, a control signal is lost, or a combination thereof.

BACKGROUND

Generally, fans and/or blowers are operated by a selector switch that allows a user to turn a fan and/or blower on and off. A fan and/or blower may also include a thermostat, which allows the fan and/or blower to automatically turn on and/or off if the temperature in a given area exceeds and/or is below a set point. Fans and/or blowers that are used in seating applications are typically placed within the seat itself and are not accessible unless the entire seat is pulled apart. Additionally, if a connection becomes disconnected or broken it is often difficult to discover the disconnection or break in the line. Thus, it is expensive and/or time consuming to fix a fan that no longer moves air.

Examples of such fans and methods of controlling fans are disclosed in U.S. Pat. No. 6,404,326 and U.S. Patent Application Publication No. 20010028185 both of which are expressly incorporated herein by reference for all purposes. What is needed is a fan that continues to operate even after the control signal is lost. What is needed is fan that continues to operate without adding a redundant external controller so that air is moved creating comfort for a user. What is further needed is a fan and/or blower, which operates independently in the event that a control signal from a main controller is lost.

SUMMARY

The teachings herein surprisingly solve one or more of these problems by providing a method of controlling a fan in a vehicle comprising: measuring a control input signal; measuring a continuous applied voltage to the fan; comparing the continuous applied voltage to a look up table; and activating the fan when the control input signal is open and the continuous applied voltage is greater than about 12.5 volts.

Another possible embodiment of the teachings herein provides a method of controlling a fan in a vehicle comprising: monitoring a voltage potential being applied to an input pin; monitoring a voltage from a power system; and activating the fan when a control signal is open and the voltage potential exceeds the system voltage by about 0.5 volts.

One possible embodiment of the present teachings includes: a method of controlling a fan in a vehicle comprising: monitoring a voltage potential being applied to an input pin; monitoring a voltage from a main controller; and activating the fan when a control signal is open (i.e. lost) and the voltage potential is 12.5 v or greater.

Yet another possible embodiment of the present teachings include: a method of controlling a fan in a vehicle comprising: monitoring a voltage potential being applied to an input pin; monitoring a voltage from a power system; and activating the fan when a control signal is open and the voltage potential exceeds the system voltage by about 0.5 volts.

The present teachings surprisingly solve one of more of these problems by including a control methodology for turning a fan on and off in the event that a control signal is lost. The present teachings include a fan that has an independent controller (i.e., microprocessor) that monitors voltage, voltage potential, input signals, temperature, impedance, mass, occupancy, or a combination thereof so that in the event that the control signal is no longer present the fan operates. The present teachings include a fan that continues to operate even after the control signal is lost; that continues to operate without adding a redundant controller, a control line, or both so that air is moved creating comfort for a user; operates independently in the event that a control signal from a main controller is lost; or a combination thereof.

DETAILED DESCRIPTION

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description. The present teachings are related to U.S. Provisional Application Ser. No. 61/587, 291 filed Jan. 17, 2012, the contents of which are incorporated by reference herein.

The present teachings may be used with any fan, blower, similar device that moves air, or a combination thereof. As discussed herein fan and blower are used interchangeably and the use of the term fan is intended to encompass a blower or any other device that moves a fluid, or a combination thereof. The fan may be located in a seat. The fan may be located in a vehicle. The fan may be attached to, located under, or both the bun of a seat, in the back of a seat, or both. Preferably, the fan may be connected to a vehicle battery. Preferably, the fan may be any fan that may be used in a vehicle to move a fluid through a vehicle seat. More preferably, the fan may be a low profile fan. Further aspects of the fan can be gleaned from the teachings herein including those of Column 1; line 57 through Column 3; line 30 and Column 3; line 61 through Column 8 line 33 of U.S. Pat. No. 6,509,704, incorporated by reference herein. The fan may further include a low profile, low profile componentry, or both and additional aspects of the fan profile can be gleaned from the teachings herein including those of Column 1; lines 17-67 and Column 5, lines 56 through Column 6, line 11 of U.S. Pat. No. 6,509,704, incorporated by reference herein.

The present teachings are predicated upon providing a fan (i.e., a blower) that includes a housing, an impeller, a motor, and control instrumentation. The control instrument includes one or more printed circuit board, a microprocessor, thermistor, sensors (i.e. back electromotive force sensors (BEMF), hall sensors, or both), or a combination thereof. The fan may further include diodes, light emitting diodes, reverse polarity diodes, zener diodes, resistors, positive temperature coefficient resistors, negative temperature coefficient resistors, a high resistant resistor, a low resistant resistor, capacitors, a thermistor, or a combination thereof.

The fan may further include one or more reverse polarity protection diodes. The reverse polarity protection diode may protect the fan, the microprocessor, or both in the event of being hooked up backwards. The fan may include one or more zener diodes. The zener diodes may be installed so that the voltage potential being applied is compatible with the working voltage of the microprocessor. The zener diode may step down the voltage to any voltage that is compatible with operating the fan, microprocessor, or both.

The fan may include one or more negative temperature coefficient (NTC) resistors. The negative coefficient resistors may decrease in resistance as temperature increases so that the fan control is regulated in response to the ambient temperature (i.e., increase in resistance as the temperature decreases). The resistance of a negative coefficient resistor may be compared to another resistor and/or a look up table, and the difference in resistance may be compared by the microprocessor to decide whether to turn the fan on or off. For example, if the ambient temperature is above a set point and the temperature setting is set to heat then the measured and/or calculated difference in voltage may too little and/or too high, and the fan may remain off. In another example, if the ambient temperature is below a set point and the temperature setting is set to cool and the difference in voltage is too little or too high the fan may remain off. In a more specific example, if the ambient temperature is 27° C. and the switch is set to heat the blower will not come on because the difference in voltage will be lower than the set point due to the change in resistance of the NTC resistor. However, if the temperature difference is in a predetermined range the fan will turn on to move the heated, cooled, ambient, or a combination thereof air.

The fan may include a high resistance resistor located at any location in the fan circuitry. The fan may include a high resistance resistor attached to the battery voltage supply. The high resistance resistor may be at any location in the circuitry so that the voltage is stepped down. The high resistance resistor may be located at any location in the circuitry so that the voltage is a constant 5 volts after the resistor. The high resistance resistor may have a measured voltage after the high resistance resistor that is less than the voltage after the low resistance resistor.

The fan may include a low resistance resistor located at any location in the fan circuitry. The fan may include a low resistance resistor attached to the control signal supply. The low resistance resistor may be at any location in the circuitry so that the control signal, when connected, is recognized by the microprocessor. The low resistance resistor may have any resistance so that when the control signal is connected, the microprocessor recognizes a voltage, a ground signal, the voltage through the low resistance resister overpowers other signal, or a combination thereof. The fan may have a signal ratio (e.g., the ratio of the low resistance signal to the high resistance signal). The ratio of the low resistance resistor to the high resistance resistor may be a sufficient amount so that the signal through the low resistance resistor overpowers other signals and controls the function of the fan when the signal is operational. A ratio of the low resistance resistor to the high resistance resistor may represent the signal strength of each signal. For example, a ratio of 2:1 represents that the low resistance resistor signal is twice as strong as the high resistance resistor. The ratio of the low resistance resistor to high resistance resistor may be about 1:1 or more, about 2:1 or more, about 5:1 or more, or about 10:1 or more. When the signal through the low resistance resistor is lost no voltage will be measured by the microprocessor. When the control signal is functional the ratio of the low resistance signal to the high resistance signal may be enough so that the microprocessor is controlled by the control signal. When the control signal is lost, the ratio of the low resistance signal to the high resistance signal may be such that the microprocessor is controlled via the control strategy of the teachings herein. When the control signal is lost the ratio of the low resistance signal to the high resistance signal may change so that the microprocessor begins running one or more of the control method steps discussed herein. When the control signal is lost the high resistance resistor's signal may overpower the "non-signal" so that the microprocessor controls the fan function.

The thermistor may be any thermistor that measures a temperature. The thermistor may be any thermistor that measures an ambient temperature. The thermistor may be located at any location in or on the fan so that the thermistor measures the ambient temperature around the fan. The thermistor may provide a temperature signal to the microprocessor. One example of a thermistor may be a negative temperature coefficient resistor as discussed herein. The microprocessor may turn the fan on or off based upon a temperature signal from the thermistor. The microprocessor may receive a signal from the thermistor. The signal from the thermistor may be an electrical signal that may be converted by the microprocessor to a corresponding temperature, which the microprocessor uses to control the blower. The microprocessor may use a look up table to convert the signal to a corresponding temperature. The microprocessor may use a look up table to determine whether the ambient temperature is high or low enough to turn the fan on or off. The microprocessor may monitor the temperature setting of the fan to determine a temperature set point. For example, if the temperature setting is set to heat then the system may have a first temperature set point, and if the temperature setting is set to cool then the system may have a second temperature set point. The thermistor may provide a signal so that the microprocessor may calculate the ambient temperature and control the heater accordingly. The microprocessor may receive signals from the control instrumentation of the vehicle. For example, the microprocessor may automatically heat, cool, ventilate, or a combination thereof based upon the measured and/or calculated ambient temperature. The microprocessor may measure one or more inputs received through a control line, a power line, or both.

The fan may be controlled by the control instrumentation of the fan, the control instrumentation of the vehicle, or both during normal operation. Preferably, the control instrumentation of the vehicle acts as a primary control device and the control instrumentation of the fan acts as the secondary control device. However, if a control signal is lost from the control instrumentation of the vehicle the fan may cease to operate. In the case of a lost signal from the control instrumentation of the vehicle the control instrumentation of the fan may continue to operate the fan so that fluid is moved by the fan.

The method of controlling a fan when the fan loses a control signal may include one or more of the following steps. The fan may obtain a control input signal from the vehicle control instrumentation. The fan instrumentation compares the control input signal to a look up table. The signal may be open. The fan may obtain a control input signal that is a 1. For example, when the signal is open and/or a 1 the fan is not receiving a signal from the vehicle control instrumentation. The signal may be closed. The fan may obtain a control input signal that is a 0. For example, when the signal is closed and/or a 0 the fan may be receiving a signal from the vehicle control instrumentation. The fan may obtain a control signal that is neither open nor closed. The fan may obtain a control signal that is neither a 1 nor a 0. For example, the fan may receive a pulse width modulated (PWM) signal. Generally, when the vehicle is off or the selector switch is in the off position the control signal is open. The control signal if the selector switch breaks may be open or 1. The control signal if the signal line breaks or becomes disconnected may be open or a 1. The fan may receive a power supply in addition to a control signal.

The method of controlling a fan may include a step of measuring a continuous applied voltage. The continuous applied voltage may be any voltage that is supplied to the fan so that the fan runs. The continuous applied voltage may be the voltage supplied by the vehicle (i.e., when the vehicle is on and the engine is running, the vehicle is off, or a time therebetween). The continuous applied voltage may be the voltage supplied from the battery. The continuous voltage may be the voltage supplied from the alternator. The microprocessor may measure the continuous applied voltage. The fan may intermittently measure the continuous applied voltage. Preferably, the fan may continuously measure the continuous applied voltage.

The system may include a system voltage. The system voltage may be any voltage so that the fan runs. The system voltage may be the same as the continuous applied voltage, the voltage potential, or both. Preferably, the system voltage is a constant voltage. More preferably, the system voltage may be a battery voltages supply when the alternator is not charging the battery. For example, current vehicles have a "12 volt system", the voltage of the system may vary as the battery charges and discharges, but the system is referred to as a 12 volt system. In another example, the system voltage may be a "24 volt system." The voltage of the system may vary by about ±2 volts or less, about ±1 volt or less, about ±0.5 volts or less, or about ±0.2 volts or less. Thus, for example, if the microprocessor measures that the continuous applied voltage, the voltage potential, or both is 25 volts and the system voltage is 24 volts the microprocessor is measuring that the continuous applied voltage, the voltage potential, or both are equal to the system voltage plus 1 volt. Therefore, in one example, if the alternator is charging the battery and the fan should be turned if the other conditions within the teachings herein are met.

The continuous applied voltage when the vehicle is on may be any voltage that is greater than about 12 volts, about 12.5 volts or greater, about 13 volts or greater, about 13.5 volts or greater, or even about 14 volts or greater. The continuous applied voltage when the vehicle is on may be about 15 volts or less or about 14.5 volts or less. The continuous applied voltage when the vehicle is off may be about less than 13 volts, preferably about 12.5 volts or less, or more preferably about 12 volts or less. The continuous applied voltage may be more than about 13 volts, about 13.5 volts or more, or about 14 volts or more when the vehicle is on (i.e. the alternator of the vehicle is producing voltage). The continuous applied voltage when the vehicle is running (i.e., the alternator of the vehicle is producing voltage) measures between about 13 and about 14 volts. The continuous applied voltage when the vehicle is off measures between about 11 volts and about 12 volts. The continuous applied voltage may be compared to a look up table.

The teachings herein contemplated that the continuous applied voltage when the vehicle is on may be any voltage that is greater than about 24 volts, about 24.5 volts or greater, about 25 volts or greater, about 25.5 volts or greater, or even about 25 volts or greater. The continuous applied voltage when the vehicle is on may be about 27 volts or less or about 26.5 volts or less. The continuous applied voltage when the vehicle is off may be less than about 25 volts, preferably about 24.5 volts or less, or more preferably about 24 volts or less. The continuous applied voltage may be more than about 25 volts, about 25.5 volts or more, or about 26 volts or more when the vehicle is on (i.e. the alternator of the vehicle is producing voltage). The continuous applied voltage when the vehicle is running (i.e., the alternator of the vehicle is producing voltage) measures between about 25 and about 26 volts. The continuous applied voltage when the vehicle is off measures between about 23 volts and about 24 volts. The continuous applied voltage may be compared to look up table.

The look up table may be used determine if the vehicle is on or off based upon the continuous applied voltage. The look up table may be used to determine if the continuous applied voltage is above a set point or below a set point. The look up table, based on the continuous applied voltage, may be used to determine whether the fan may be switched on or whether the fan may be switched off. The microprocessor of the fan may include the look up table. The microprocessor of the fan may compare the measured continuous applied voltage to the look up table. The microprocessor may activate the fan based upon one or more inputs the microprocessor monitors or measures. Preferably, the look up table includes some hysteresis. More preferably, the voltage to turn the fan on is higher than the voltage to turn the fan off. The voltage at which the processor turns the fan off and on may be the same voltage. Preferably, the voltage at which the processor turns the fan off and on are different. More preferably, the voltage at which the fan turns on and the fan turns off are different enough so that the fan does not cycle on and off. The on voltage and the off voltage may be any voltage where the fan turns on and off without cycling between off and on. The "on" voltage and the "off" voltage may be any of the voltages discussed herein. The "on" voltage and "off" voltage as listed on the look up table may be different. Preferably, the "on" voltage and the "off" voltage of the fan may have a difference (i.e., a hysteresis) of about ±1 volt or less, about ±0.8 volts or less, about ±0.5 volts or less, or preferably about ±0.3 volts or less without the two voltages being equal. The difference between the "on" voltage and the "off" voltage may have a difference of about 0.05 volts or more, about 0.1 volts or more, or about 0.2 volts or more. The difference between the on voltage and the off voltage may be between about 1 volt and about 0.1 volts, and preferably between about 0.5 volts and 0.2 volts.

The microprocessor may activate the fan when the continuous applied voltage is grater than 12 volts. The microprocessor may activate the fan when the continuous applied voltage is greater than about 28 volts. The microprocessor may activate the fan when the control input signal is open, a 1, lost, or a combination thereof. The microprocessor may activate the fan when the continuous applied voltage is greater than 12 volts, preferably about 12.5 volts or greater, or more preferably about 13 volts or greater; and the control input signal is open, a 1, is lost, or a combination thereof. The microprocessor may activate the fan when the continuous applied voltage is greater than 24 volts, preferably about 24.5 volts or greater, or more preferably about 25 volts or greater; and the control input signal is open, a 1 is lost, or a combination thereof. The microprocessor may activate the fan when the continuous applied voltage, voltage potential, measured voltage, or a combination thereof are equal to the system voltage plus about 0.2 volts or more, about 0.5 volts or more, preferably about 0.75 volts or more, more preferably about 1.0 volts or more, or even about 1.2 volts or more. The microprocessor may deactivate the fan when the continuous applied voltage, voltage potential, measured voltage or a combination thereof approach the system voltage. For example, if the fan activates when the voltage is equal to the system voltage plus 0.5 volts then the fan may deactivate when the voltage is equal to or below the system voltage plus 0.2 volts. The microprocessor may deactivate the fan when the continuous applied voltage, voltage potential, measured voltage, or a combination thereof are equal to the system voltage plus about 1.0 volt or less, about 0.75 volts or less, preferably about 0.5 volts or less, or more preferably about 0.2 volts or less. The differences between the activation voltage and the deactivation voltage may be between about 1 volt and 0.01 volts, preferably between about 0.75 volts and 0.05 volts, and more preferably between about 0.4 volts and about 0.1 volts. The input control signal may be from a main controller. The input control signal may be from a vehicle computer. The microprocessor may receive an input control signal from a main controller, a vehicle computer, or both. The microprocessor may be free of an input control signal. The microprocessor may monitor a voltage potential.

The microprocessor may monitor an input pin of the fan. The microprocessor may monitor a voltage potential being applied to an input pin. The microprocessor may monitor the voltage potential being applied to the fan. The microprocessor may monitor the voltage being applied to the fan. The microprocessor may monitor the voltage being applied to the microprocessor. The microprocessor may measure the voltage leaving the main controller. The microprocessor may measure the voltage signal leaving the main controller. The voltage potential when the vehicle is off may be about 12 volts or less, about 11.5 volts or less, or even about 11 volts or less. The voltage potential, when the vehicle is on, may be greater than about 12 volts, preferably about 12.5 volts or greater, more preferably about 13 volts or greater, or most preferably about 13.5 volts or greater. The voltage potential when the vehicle is on may be between about 13 volts and about 14 volts. The microprocessor may compare the voltage potential to a look up table. The look up table in the microprocessor may indicate that the fan may be turned on when the voltage potential is greater than about 12 volts, preferably about 12.5 volts or greater, or more preferably about 13 volts or greater. The microprocessor may turn the fan on when the voltage is about 12 volts or greater, preferably about 12.5 volts or greater, more preferably about 12.8 volts or greater, or most preferably about 13.0 v or greater; and the control signal is open, lost, a 1, or a combination thereof. The voltage potential when the vehicle is off may be about 24 volts or less, about 23.5 volts or less, or even about 23 volts or less. The voltage potential, when the vehicle is on, may be greater than about 24 volts, preferably about 24.5 volts or greater, more preferably about 25 volts or greater, or most preferably about 25.5 volts or greater. The voltage potential when the vehicle is on may be between about 25 volts and about 26 volts. The microprocessor may compare the voltage potential to a look up table. The look up table in the microprocessor may indicate that the fan may be turned on when the voltage potential is greater than about 24 volts, preferably about 24.5 volts or greater, or more preferably about 26 volts or greater. The microprocessor may turn the fan on when the voltage is about 24 volts or greater, preferably about 24.5 volts or greater, more preferably about 24.8 volts or greater, or most preferably about 25.0 v or greater; and the control signal is open, lost, a 1, or a combination thereof. As discussed herein the look up table may include hysteresis so that the fan does not cycle between on and off.

The fan of the teachings herein may further be attached to a temperature sensor. The temperature sensor may be any temperature sensor that measures the temperature of a fluid. A negative temperature coefficient thermistor or a resistor ad discussed herein are examples of possible temperature sensors. In addition to measuring one or more of the voltages, signals, or both the fan may include a step of measuring the temperature. The fan may turn on when the measured temperature is over and/or under a set temperature in addition to the other conditions being met. For example, the fan, when the temperature selector is selected for heat, may turn on when the measured ambient temperature is about 27° C. or less, about 22° C. or less, about 16° C. or less, preferably about 10° C. or less, or more preferably about 8° C. or less. In another example, the fan when the temperature selector is selected for cool and/or vent, may turn on when the measured ambient temperature is about 15° C. or more, about 20° C. or more, about 23° C. or more, preferably about 27° C. or more, or more preferably about 31° C. or more.

The method may include a step of monitoring a use input for the temperature setting. For example, the microprocessor may monitor whether the temperature setting is set to high or low. The method may include a step of relaying the temperature setting to the microprocessor. The method may include a step of measuring the ambient temperature. The method may include a step of using a thermistor to measure ambient temperature. The method may include a step of using a thermistor to measure an ambient temperature in a vehicle. The method may include a step of comparing the temperature to the set point. The method may include a step of monitoring the temperature setting and the selecting a set point. The method may include a step of monitoring a resistance ratio. The method may include a step of monitoring a ratio between a high resistance resistor and a low resistance resistor.

The method discussed herein may include monitoring a passenger sensor. The passenger sensor may be any type of passenger sensor suitable for sensing a passenger in a vehicle seat. The passenger sensor may be a membrane sensor, a capacitive sensor, a force sensor, a mass sensor, or a combination thereof. The microprocessor may monitor the passenger sensor for a passenger. For example, the microprocessor may be attached to a passenger sensor and when the passenger sensor measures that the seat is free of an occupant the fan may remain off even if all of the other conditions are met. However, the microprocessor may turn the fan on when the conditions are met and the passenger sensor senses an occupant in the vehicle seat.

The method discussed herein may sense an occupant based upon impedance, revolutions per minute of the blower, or both as opposed to using a passenger sensor. The microprocessor may measure the amount force required by the fan to move air through the vehicle seat. For example, a seat without an occupant may require the fan to rotate at a rate of 220 revolutions per minute (RPM) and a seat with an occupant may require the fan to rotate at a rate of 250 revolutions per minute (RPM). Once one or more of the conditions discussed herein such as no control signal, the temperature being above or below a set point, or both are met the microprocessor may turn the fan on. The microprocessor may then monitor the impedance, the RPM's of the fan, or both in order to determine if the seat includes an occupant. If the vehicle seat is free of an occupant the microprocessor may then turn the fan off. Further aspects of controlling the fan based upon impedance and/or RPM's can be gleaned from the teachings herein including those of Paragraph Nos. 005-009, 0019, 0021-0023 and FIGS. 2-7 of U.S. Patent Application Publication No. 2005/0047922, which are incorporated by reference herein.

The fan as discussed herein may be used in conjunction with any seat heating and/or cooling device. The fan may be used with Pelletier device (i.e., a thermo-electric device), resistive heater (e.g., wire heater or positive temperature coefficient (PTC) heater), or a combination thereof. The microprocessor and method discussed herein may turn the heater and/or the air cooler on as well as the fan when the control signal is lost. The microprocessor may select whether to turn the device on heat and/or cool based upon a temperature reading by the thermistor.

Figure 1:
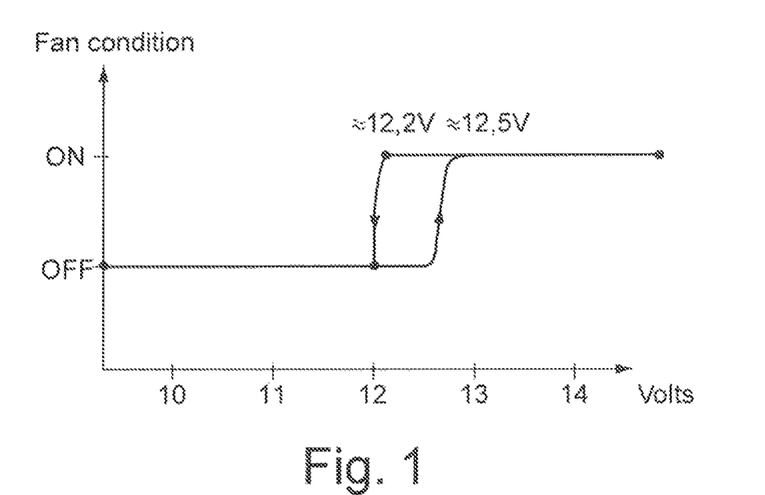
FIG. 1 illustrates an example of a look up table based on a 12 volt system

FIG. 1 illustrates one example of a 12 volt look up table that is used with the teachings herein. The look up table also includes hysteresis so that the system avoids cycling on and off. As illustrated the system turns one when the measured voltage achieves a voltage of about 12.5 volts. The system turns off when the measured voltage decreases to about 12.2 volts. The system of the present teachings will continuously monitor the continuous applied voltage, the voltage potential being applied to an input pin, the voltage from a main controller, or a combination thereof and when the voltage achieves set point in the look up table of about 12.5 volts or more the fan will be turned on. After the fan is turned on the system will continue to monitor the continuous applied voltage, the voltage potential being applied to an input pin, the voltage from a main controller, or a combination thereof until the measurement is about 12.2 volts and then the system will turn the fan off.

Figure 2:
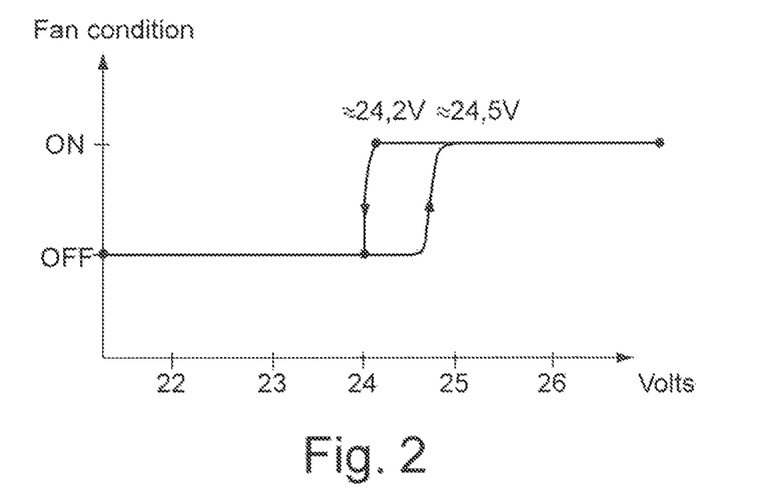
FIG. 2 illustrates an example of a look up table based on 24 volt system.

FIG. 2 illustrates an example of a 24 volt look up table that is used with the teachings herein. The look up table includes hysteresis so that the fan is turned on when the system achieves a voltage of greater than about 24.5 volts and turns off when the voltage of the system drops to about 24.2 volts or below.

Figure 3:
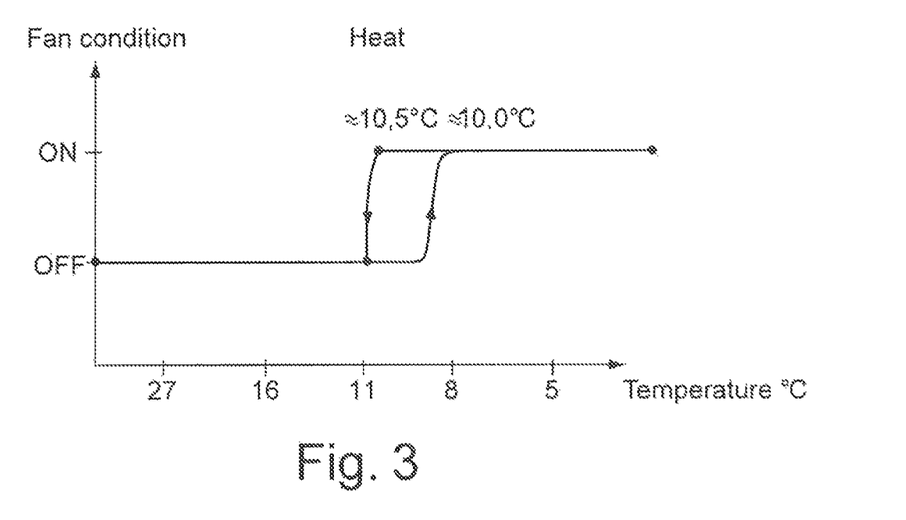
FIG. 3 illustrates an example of a look up table to turn on/off the fan when in the heating condition.

FIG. 3 includes an example of a look up table used when the fan is set to heat. When the microprocessor recognizes that the seat is set to heat the microprocessor compares the measured ambient temperatures of the vehicle to the look up table. The fan remains off until the measured ambient temperature in the vehicle drops to 10° C. or below. Once the fan turns on it remain on until the measured ambient temperature in the vehicle increases to above 10.5° C.

Figure 4:
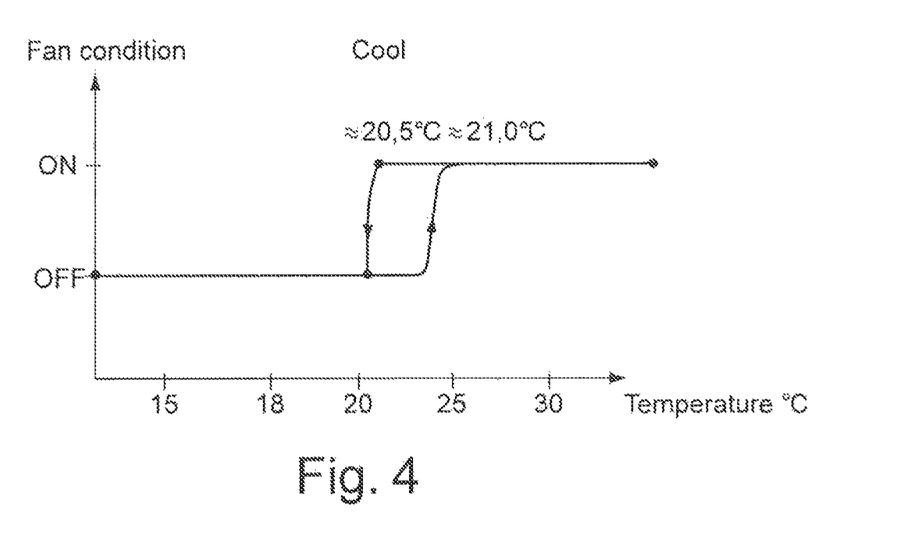
FIG. 4 illustrates an example of a look up table to turn on/off the fan when in the cooling condition.

FIG. 4 illustrates an example of a look up table used when the fan is set to cool. The microprocessor continually compares a measured ambient temperature of the vehicle to the look up table. The fan turns on when the measured ambient temperature of the vehicle is about 21° C. or greater. The fan remains on until the measured ambient temperature in the vehicle drops to a temperature of about 20.5° C. or less.

Figure 5:
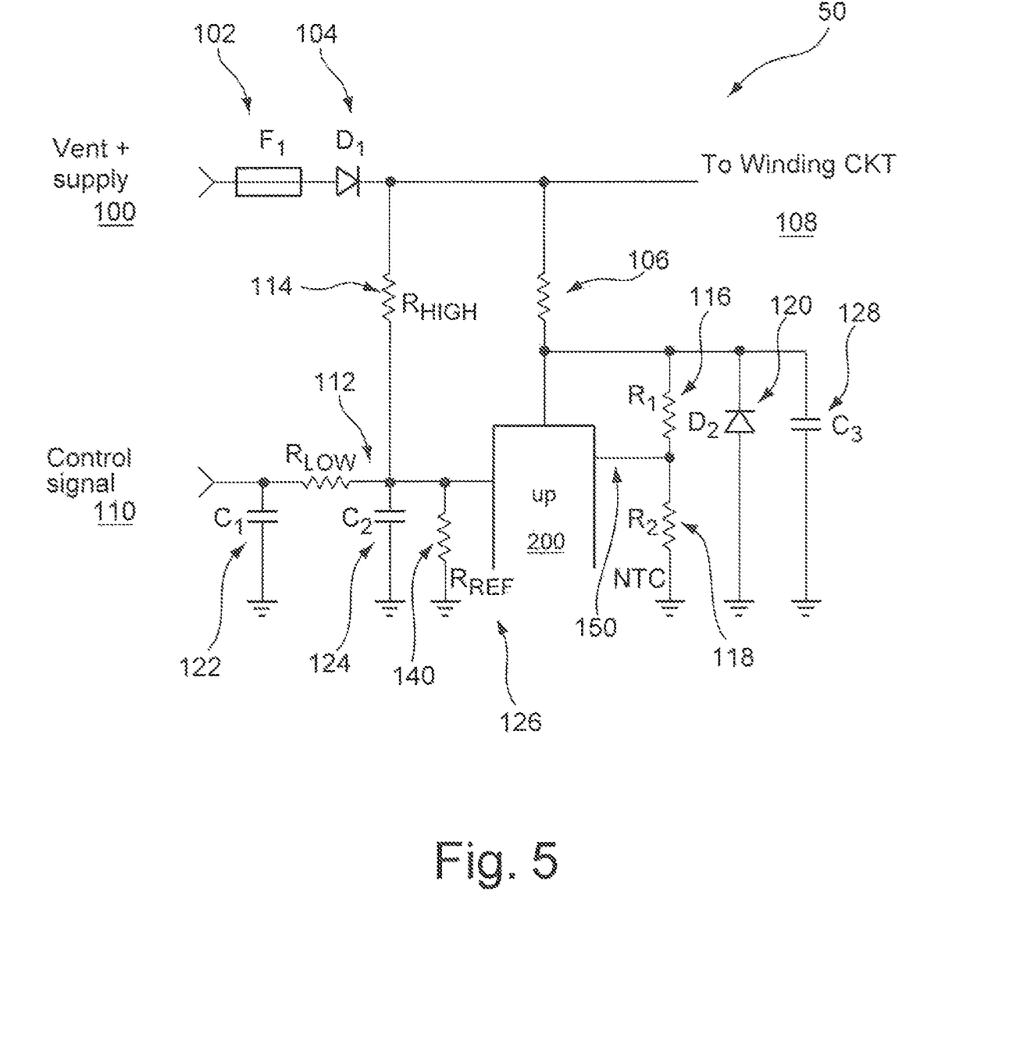
FIG. 5 illustrates an example of one possible control schematic.

FIG. 5 illustrates one possible circuit schematic of the present teachings. The circuit diagram 50 illustrates a battery supply 100 that supplies voltage to the system. The voltage passes through a fuse 102 to protect the microprocessor from any potential voltage spikes. The voltage then passes from the fuse 102 through a schottky diode 104 so that the voltage is dropped. After the voltage passes through the schottky diode 104 the voltage is stepped down to 5 volts via a resistor 106. The stepped down power supply supplies power to the microprocessor 200. The microprocessor 200 remains in a quiescent state measuring the signal and/or voltage a first pin 140. The microprocessor measures the voltage at a high resistance resistor 114 and measures the voltage at a reference resistor 126 that is applied to the first pin 140. The microprocessor 200 then compares a ratio of the high resistance resistor 114 and the reference resistor 126. This ratio is compared to a ratio of a low resistance resistor 112 and a high resistance resistor 114 in order to determine whether the control signal 110 is functioning and controlling the blower.

The circuit diagram 50 includes a control signal 110 entering the system. The control signal 110 passes through a low voltage resistor 112 to an input pin 120 where the microprocessor 300 monitors the signal. The microprocessor compares the ratio of the low resistance resistor 112 and the high resistance resistor 114. The ratio of the low resistance resistor 112 to the high resistance resistor 114 is compared to the ratio of the high resistance resistor 114 to the reference resistor 126. During conditions where the control signal 110 is functioning the ratio of the low resistance resistor 112 to the high resistance resistor 114 will be higher than the ratio of the high resistance resistor 114 to the reference resistor 126 so the fan will be controlled by control signal. If the control signal 110 is lost then the ratio of the high resistance resistor 114 to the reference resistor 126 will be greater than the ratio of the low resistance resistor 112 to the high resistance resistor 114 and the microprocessor will perform the method steps discussed herein. The control signal circuitry includes a first capacitor 122 and a second capacitor 124 to reduce noise on the first pin 140. The circuit diagram 50 includes a function to control the blower based upon the ambient temperature. The microprocessor 200 compares the resistance levels on the first pin 140 as discussed above and once the microprocessor 200 determines that the control signal 110 has been lost the microprocessor 200 will look to the second pin 150 in order to determine if a second set of running conditions has been met. The second pin 150 measures the voltage from a negative coefficient resistor 118 and compares the voltage to voltage reference 116 so that the microprocessor 200 can calculate the ambient temperature. This temperature is compared to settings on a look up table as illustrated in FIGS. 3 and 4 in order to determine a running condition. The circuit further includes a zener diode 120 to control the voltage so that the voltage to the microprocessor 200 does not exceed 5 volts. The circuit also includes a capacitor 128 so that the noise in the signal to the second pin 150 is reduced and/or eliminated.

Figure 6:
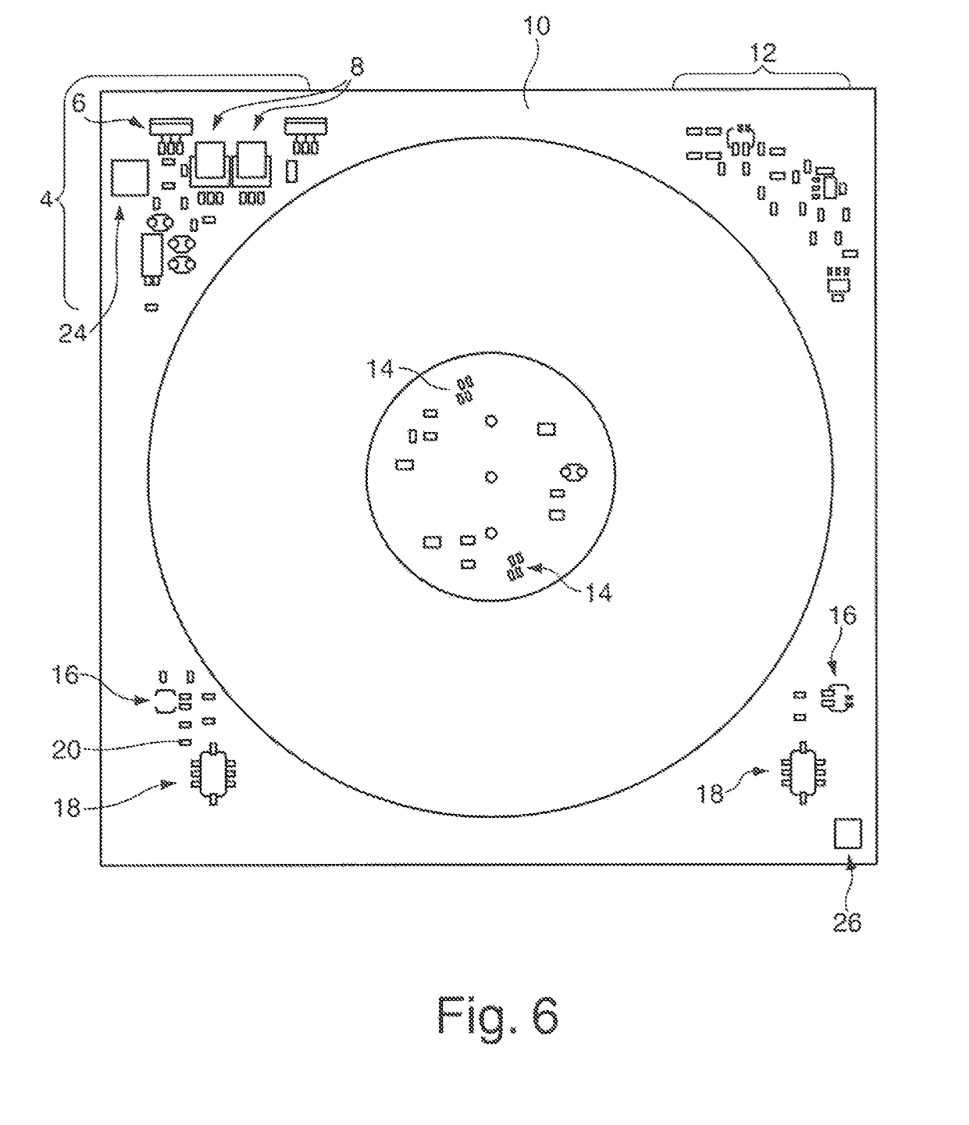
FIG. 6 illustrates one possible configuration of circuitry schematic that may be used in the fan.

FIG. 6 illustrates one possible configuration of the present teachings illustrate internal blower circuitry 2. The internal blower control circuitry 2 includes a circuit board 10. The circuit board 2 includes blower control circuitry 4, a rotor controller 6, switching circuitry 8, blower performance feedback circuits 12, light emitting diodes 16, ports 18, fuses 20, a microprocessor 24, and a thermistor 26 on the circuit board 10. As illustrated a middle region of the circuit board 10 includes hall sensors 14 and coil connector 22.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes, that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

I claim:

1. A method of controlling a fan in a vehicle seat comprising:
    a microprocessor within the fan performing the steps of:
        a. measuring a control input signal from a main controller that is located external of the fan;
        b. measuring a continuous applied voltage to the fan;
        c. comparing the continuous applied voltage to a look up table; and
        d. activating the fan when the control input signal is open and the continuous applied voltage is greater than a system voltage by about 0.5 volts.

2. The method of claim 1, wherein the fan is activated when the continuous applied voltage is between about 13 volts and about 14 volts.

3. The method of claim 1, wherein the fan is deactivated when the continuous applied voltage is about 12.5 volts or less and the control signal is open.

4. The method of claim 1, wherein the fan is deactivated when the continuous applied voltage is between about 11 volts and about 12 volts.

5. The method of claim 1, wherein the fan is activated when the continuous applied voltage is between about 25 volts and about 26 volts.

6. The method of claim 1, wherein the fan is deactivated when the continuous applied voltage is less than about 24.5 volts.

7. The method of claim 1, wherein the fan is deactivated when the continuous applied voltage is between about 23 volts and about 24 volts.

8. The method of claim 1, wherein the microprocessor obtains the control input signal, measures the continuous applied voltage, compares the control input signal and the continuous applied voltage to a look up table, or a combination thereof.

9. The method of claim 1, wherein the microprocessor activates the fan when the control signal is open and the continuous applied voltage is greater than about 12 volts.

10. The method of claim 1 wherein the fan is free of a contra signal from the main controller, and
    wherein the microprocessor of the fan is connected to a passenger en and the fan remains off if a passenger is not sensed in the vehicle seat.

11. The method of claim 1, wherein the fan includes a thermostat;
    wherein the thermostat measures the ambient temperature around the fan, and if the temperature around the fan exceeds a pre-set set point the fan is activated and if the fan is below the pre-set set point the fan is deactivated.

12. The method of claim 1, wherein the method includes a step of monitoring a user input for a temperature setting.

13. A method of controlling a fan in a vehicle seat comprising:
    a microprocessor within the fan performing the steps of:
        a. monitoring a voltage potential being applied to an input pin from a main external controller;
        b. monitoring a voltage from a power system; and
        c. activating the fan when a control signal from the main external controller is open and the voltage potential exceeds the system voltage by about 0.5 volts.

14. The method of claim 13, wherein the fan is deactivated when the voltage from the power system is about 12.5 v or less.

15. The method of claim 13, further including deactivating the fan when the voltage potential is below about 12.0 volts, the control signal is closed, or both.

16. The method of claim 13, wherein the fan is deactivated when the voltage from the power system is about 24.5 v or less.

17. The method of claim 13, wherein the microprocessor monitors the voltage potential, the control signal from the main controller, or both.

18. The method of claim 13, wherein the microprocessor activates the fan when the control signal is open and the voltage potential is 12.5 v or greater.

19. The method of claim 13, further including a thermistor, and
    wherein the microprocessor of the fan is connected to a passenger sensor and the fan remains off if a passenger is not sensed in the vehicle seat.

20. The method of claim 13, wherein the method includes a step of monitoring a user input for a temperature setting.

* * * * *

UNITED STATES PATENT AND TRADEMARK OFFICE
CERTIFICATE OF CORRECTION

| | | |
|---|---|---|
| PATENT NO. | : 8,704,477 B2 | Page 1 of 1 |
| APPLICATION NO. | : 13/668483 | |
| DATED | : April 22, 2014 | |
| INVENTOR(S) | : Fred A Brown | |

It is certified that error appears in the above-identified patent and that said Letters Patent is hereby corrected as shown below:

In the Claims

Claim 10, Column 12, Line 8, delete "free of a contra signal" and insert --free of a control signal--
Claim 10, Column 12, Line 11, delete "passenger en" and insert --passenger sensor--

Signed and Sealed this
Twenty-second Day of July, 2014

Michelle K. Lee
*Deputy Director of the United States Patent and Trademark Office*